(12) United States Patent
Dandekar et al.

(10) Patent No.: US 7,921,097 B1
(45) Date of Patent: Apr. 5, 2011

(54) SYSTEMS AND METHODS FOR GENERATING A DESCRIPTIVE UNIFORM RESOURCE LOCATOR (URL)

(76) Inventors: Pranav Dandekar, Seattle, WA (US); Vinit Kalra, Seattle, WA (US); Jan Klier, Seattle, WA (US)

( * ) Notice: Subject to any disclaimer, the term of this patent is extended or adjusted under 35 U.S.C. 154(b) by 834 days.

(21) Appl. No.: 11/848,036

(22) Filed: Aug. 30, 2007

(51) Int. Cl.
*G06F 17/00* (2006.01)
(52) U.S. Cl. .......................... 707/707; 726/9
(58) Field of Classification Search .......... 707/601, 707/707
See application file for complete search history.

(56) References Cited

U.S. PATENT DOCUMENTS

| | | | |
|---|---|---|---|
| 6,556,989 B1 * | 4/2003 | Naimark et al. | 707/749 |
| 6,990,494 B2 * | 1/2006 | Bates et al. | 715/234 |
| 7,539,776 B1 * | 5/2009 | Saare et al. | 709/247 |
| 7,672,943 B2 * | 3/2010 | Wong et al. | 709/218 |
| 2004/0128285 A1 * | 7/2004 | Green et al. | 707/3 |
| 2007/0104326 A1 * | 5/2007 | Feigenbaum et al. | 380/44 |

OTHER PUBLICATIONS

Vidal et al., "Structure-Driven Crawler Generation by Example", Aug. 6-11, 2007, ACM, pp. 292-299.*
"Google Ranking Factors—SEO Checklist," http://www.vaughns-1-pagers.com/internet/google-ranking-factors.htm, Nov. 24, 2008.
"Should You Use Targeted Keywords in URL?" http://www.webrankinfo.com/english/seo-news/keywords-in-url.php, Nov. 24, 2008.
"Keywords in URL May Help Rankings, Google's Matt Cutts Says," http://blog.searchenginewatch.com/blog/060831-093338, Nov. 24, 2008.
CNET News, "Goals led Dell to cook the books," http://news.cnet.com/Goals-led-Dell-to-cook-the-books/2100-1014_3-6203071.html?tag=mncol, Dec. 29, 2008.
Ebay.com, "New Apple Ipod Nano 8GB Pink 3rd Gen Video MP3 Player," http://cgi.ebay.com/NEW-APPLE-IPOD-NANO-8GB-PINK-3RD-GEN-VIDEO-MP3-PLAYER_W0QQitemZ200291149059QQcmdZViewItemQQptZOther_MP3_Players?hash=item200291149059&_trksid=p3286.c0.m14&_trkparms=72%3A1209%7C66%3A2%7C65%3A12%7C39%3A1%7C240%3A1318%7C301%3A1%7C293%3A1%7C294%3A50, Dec. 29, 2008.
Shopping.com, "Digital Cameras," http://www.shopping.com/xPP-digital_cameras--5_mega_pixel_digital_cameras, Dec. 29, 2008.
Buy.com, "Lenovo ThinkPad T61 Notebook—646557U," http://www.buy.com/prod/lenovo-laptop-computer-t61-t7100-1-80g-1gb120gb-dvd-15-4-wxga-wl/q/loc/101/204681854.html, Dec. 29, 2008.

* cited by examiner

*Primary Examiner* — Matthew B Smithers
(74) *Attorney, Agent, or Firm* — Lee & Hayes, PLLC

(57) ABSTRACT

A method for generating a Uniform Resource Locator (URL) is described. Content associated with a web page is obtained. A URL is generated based on the content of the web page. The URL includes one or more tokens. The URL is limited to a token threshold. The token threshold is defined as a maximum number of words in the URL. One or more tokens are removed from the URL. The URL is associated with the web page.

43 Claims, 10 Drawing Sheets

SYSTEMS AND METHODS FOR GENERATING A DESCRIPTIVE UNIFORM RESOURCE LOCATOR (URL)

TECHNICAL FIELD

The present disclosure relates generally to computers and computer-related technologies. More specifically, the present disclosure relates to generating descriptive Uniform Resource Locators (URLs).

BACKGROUND

The Internet is a worldwide, publicly accessible network of interconnected computer networks that transmit data. The World Wide Web (the Web) is a collection of interconnected documents and other resources that are linked together by Uniform Resource Locators (URLs). Transmitting information from the World Wide Web over the Internet is vastly popular in today's society.

A search engine may be used to help find information stored on the World Wide Web. The search engine allows a user to ask for content that meets specific criteria and retrieves a list of items that match those criteria. This list is often sorted with respect to some measure of relevance of the results to the search query.

The list of search results provided by a search engine may include URLs of web pages that match the criteria entered into the search engine. The higher a URL is placed on the list, the more likely a user is to select that particular URL. The location of a URL on the list is referred to as a "ranking." The better "ranking" a URL possesses, the higher the URL is on the list.

Online merchants have web sites with a number of different web pages that include information relating to products that are for sale. For example, an online merchant may have a web page for a certain book that includes detailed information about the book (i.e., author's name, publication date, etc.) The ranking of a web page may be influenced by the content included within the URL assigned to that web page. For example, if a user enters the terms "Harry" and "Potter" into a search engine, URLs that include the words "Harry" and "Potter" will be ranked higher than URLs that do not include these words, all else being equal. As previously mentioned, higher ranked URLs are more likely to be accessed by a user than lower ranked URLs. In other words, a highly ranked URL may increase the revenue of an online merchant because of increased traffic to the highly ranked URL.

As such, benefits may be realized by systems and methods that generate descriptive URLs that reflect the content of a web page to which the URL is assigned. Descriptive URLs based on the web page content may improve the ranking awarded to the web page by a search engine.

DETAILED DESCRIPTION

Figure 1:
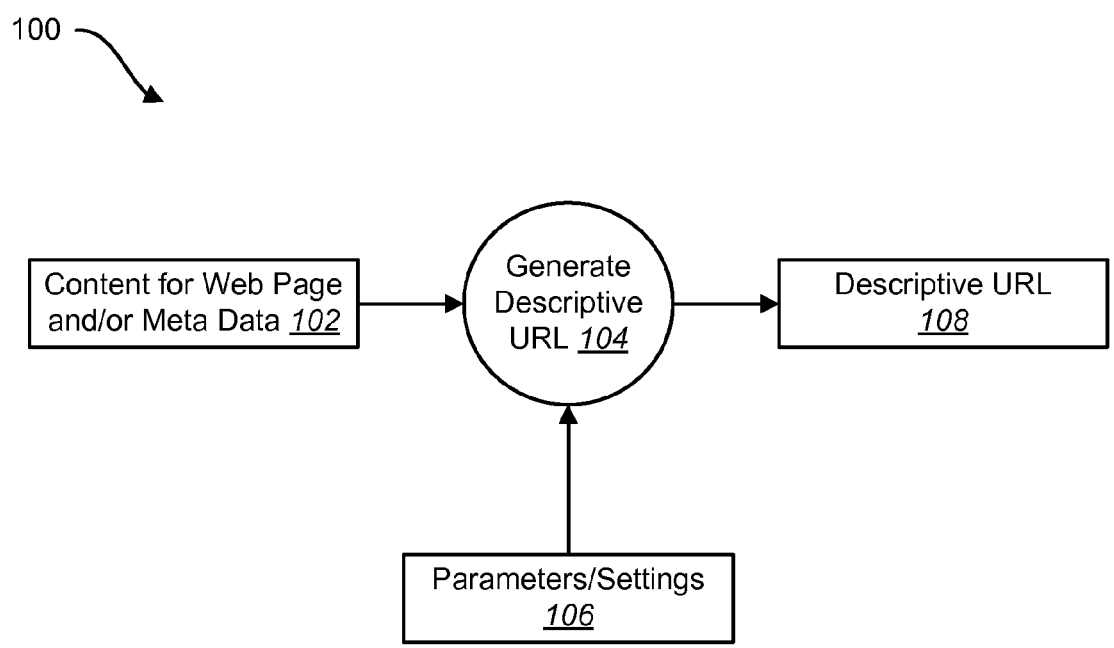
FIG. 1 is a block diagram illustrating a process for generating a descriptive Uniform Resource Locator (URL) for a web page.

A method for generating a Uniform Resource Locator (URL) is described. Content associated with a web page is obtained. A URL is generated based on the content of the web page. The URL includes one or more tokens. The URL is limited to a token threshold. The token threshold is defined as a maximum number of words in the URL. One or more tokens are removed from the URL. The URL is associated with the web page.

In one configuration removing one or more tokens from the URL includes removing single-character and two-character tokens from the URL if the length of the URL exceeds the token threshold. An aspect of removing one or more tokens from the URL may also include removing duplicate tokens from the URL. A further aspect of removing one or more tokens from the URL may include removing a year of release or publication for the product from the URL.

If the length of the URL exceeds the token threshold, the tokens of the URL may be weighted. In one configuration the tokens with smallest weights may be removed until the length of the URL does not exceed the token threshold. The tokens of the URL may be prioritized if the length of the URL exceeds the token threshold.

The web page may include, but is not limited to, a detail web page having details regarding a product or a list web page having one or more lists.

In another configuration, additional tokens may be added to the URL if the length of the URL is less than the token threshold. The additional tokens may include, but are not limited to, a brand name, an author's name, an artist's name or a model number. Child node names may be added to the URL if the length of the URL is less than the token threshold.

In a further configuration the web page may include a browse ladder. An aspect of generating a URL may include setting the URL to an inverted browse ladder. An aspect of removing one or more tokens from the URL may include removing generic ladder steps from the URL.

A feature may include identifying one or more essential store names and adding at least one essential store name token to the URL.

In one embodiment the URL may be generated on the fly. In another embodiment the URL may be generated before it is needed and stored for future use.

One configuration may forward a request to the URL. A request may be received from a client. The request may include an incoming URL. It may be determined that the incoming URL is associated with the web page. It also may be determining that the incoming URL is different than the URL. The request may be forwarded to the URL.

The URL may be generated based on the content of the web page and meta data associated with the web page.

A computer system configured to generate a Uniform Resource Locator (URL) is also described. The computer system includes a processor and memory in electronic communication with the processor. Executable instructions are stored in the memory. Content associated with a web page is obtained. A URL is generated based on the content of the web page. The URL includes one or more tokens. The URL is limited to a token threshold. The token threshold is defined as a maximum number of words in the URL. One or more tokens are removed from the URL. The URL is associated with the web page.

A computer-readable medium comprising executable instructions is also described. Content associated with a web page is obtained. A URL is generated based on the content of the web page. The URL includes one or more tokens. The URL is limited to a token threshold. The token threshold is defined as a maximum number of words in the URL. One or more tokens are removed from the URL. The URL is associated with the web page.

A computer system configured to generate a Uniform Resource Locator (URL) is described. The computer system includes means for obtaining content associated with a web page. The system also includes means for generating a URL based on the content of the web page, wherein the URL includes one or more tokens. Means for limiting the URL to a token threshold is also part of the system. The token threshold defines a maximum number of words in the URL. The computer system also includes means for removing one or more tokens from the URL and means for associating the URL with the web page.

Several exemplary embodiments are now described with reference to the Figures. This detailed description of several exemplary embodiments, as illustrated in the Figures, is not intended to limit the scope of the claims.

The word "exemplary" is used exclusively herein to mean "serving as an example, instance or illustration." Any embodiment described as "exemplary" is not necessarily to be construed as preferred or advantageous over other embodiments.

As used herein, the terms "an embodiment," "embodiment," "embodiments," "the embodiment," "the embodiments," "one or more embodiments," "some embodiments," "certain embodiments," "one embodiment," "another embodiment" and the like mean "one or more (but not necessarily all) embodiments," unless expressly specified otherwise.

The term "determining" (and grammatical variants thereof) is used in an extremely broad sense. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The present systems and methods describe algorithms that generate descriptive Uniform Resource Locators (URLs) with relevant keywords while limiting the URL to a threshold length. In one embodiment the threshold length may be in terms of the number of words/tokens (not necessarily in terms of the number of letters/characters). These descriptive URLs may be computed as they are needed (e.g., "on the fly"). In one embodiment, the descriptive URLs are pre-computed and stored in a location for future use and then fetched on the fly from the database. Systems and methods that generate descriptive URLs from relevant keywords may result in incremental traffic to those web pages associated with the descriptive URLs from search engines leading to higher revenue.

FIG. 1 is a block diagram illustrating a process 100 for generating 104 a descriptive URL 108 for a web page based on content for that web page 102 or meta data about the web page 102. Meta data about the web page 102 may be any information that relates to the web page 102 but may not be part of the web page 102. The process 100 for generating 104 the descriptive URL 108 uses the contents from the web page 102 to generate the URL based on parameters or settings 106, which will be discussed more below. The output from the process 100 is a descriptive URL 108 that may be used as the URL for the web page. The descriptive URL 108 includes relevant keywords. One example of such a descriptive URL may be "Apple-iPod-video-Black-Generation". Relevant keywords in the URL help the web page rank higher on search results for those keywords, resulting in increased traffic to the web page.

Figure 2:
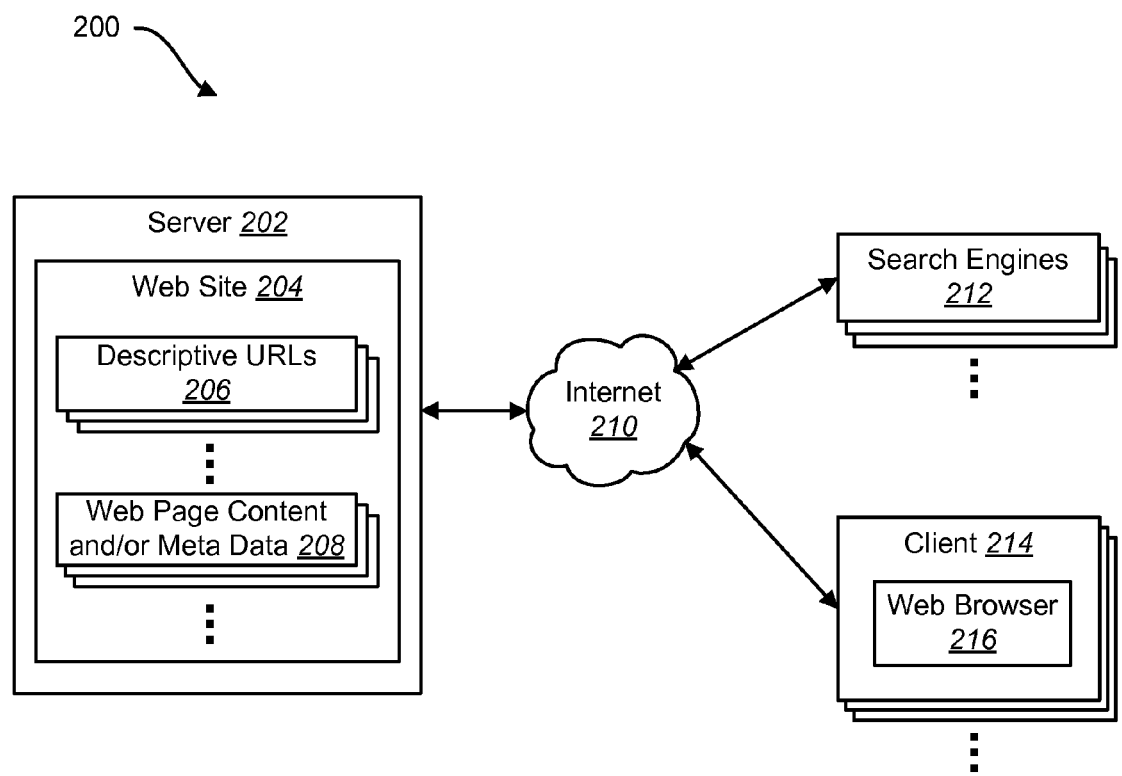
FIG. 2 illustrates a block diagram of an embodiment of a web site using descriptive URLs over the Internet.

FIG. 2 illustrates a block diagram 200 of an embodiment of a web site 204 using descriptive URLs 206 over the Internet 210. A server 202 is shown in electronic communication with the Internet 210. Communication between the server 202 and clients 214, including search engines 212, may occur via the Internet 210. The server 202 may be a web server that hosts the web site 204. The web site 204 may include a plurality of web pages or web page content and/or meta data 208 that is provided to clients 214 requesting the web pages. The web pages may be static, dynamic, or a combination of static and dynamic components. As a result, some of the web page content 208 may be generated when it is requested.

The web site 204 uses a plurality of descriptive URLs 206 that clients 214 and/or search engines 212 use to request the web pages. In one embodiment, the descriptive URLs 206 may be dynamically generated as they are needed. In another embodiment, the descriptive URLs 206 may be generated and stored such that they are static. Each of the plurality of descriptive URLs 206 may be associated with one of the plurality of web pages 208. A web browser 216 on the client 214 may be used to view web pages 208 from the web site 204 by requesting a web page using a descriptive URL 206.

Search engines 212 operate to search and index content on the Web in order to facilitate users finding relevant web pages. Using a system to generate descriptive URLs 206 may help the web site 204 to optimize its URLs for search engine rankings by inserting keywords most relevant to the webpage into its URL which will most likely result in an increase in the ranking of the URL. The keywords used in the descriptive URL may be based on product-specific data. Such a system may be helpful in increasing revenue for web sites 204 that offer items for sale.

As discussed in relation to FIG. 1, each of the descriptive URLs 206 are generated based on content 208 from one or more web pages. An online merchant's web site includes many different kinds of content that all may be used in generating a descriptive URL 206. Some examples of such content will be provided hereinafter.

An online merchant's web site 204 may offer many different products for sale. A separate web page may be provided for each product that is offered for sale. Such web pages may be referred to as "product detail" pages.

The product detail page associated with a particular product may include certain information about the product. For example, the product detail page for a book may include the title of the book, the author of the book, the number of pages in the book, etc.

An online merchant's web site may group the products that it offers for sale into general categories, such as books, electronics, clothing, sporting goods, etc. Within each category, one or more sub-categories may be created. For example, the books category may include sub-categories such as history, fiction, technical, etc. These sub-categories may be further divided into additional sub-categories.

On a particular product detail page, information may be provided about similar products. For example, there may be a section of the product detail page that shows products that were also purchased by people who purchased the current product.

The preceding were only a few examples of web content that may be used in accordance with the present systems and methods. However, there are many other options for content that may be used to generate descriptive URLs 206. The options that are available for web pages from a particular web site may depend on various features and aspects of the web site itself. A sophisticated web site with many different ways of interrelating products may provide a number of additional web content options that, although not specifically mentioned herein, are consistent with the present systems and methods.

Figure 3:
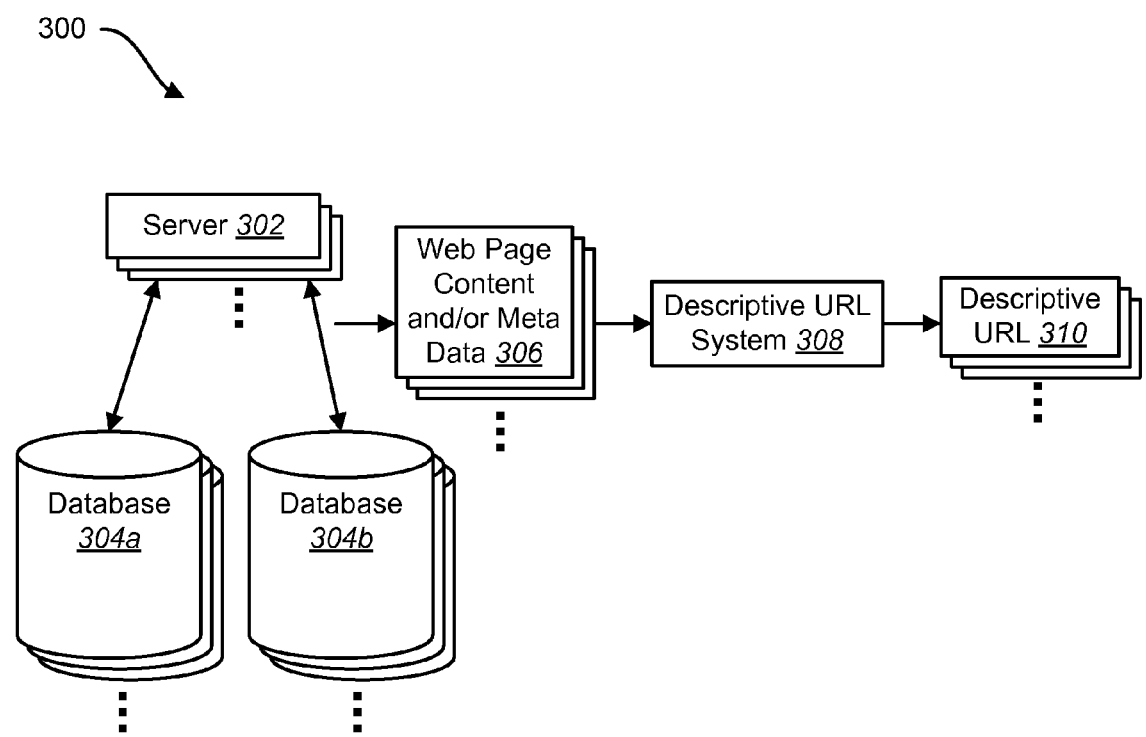
FIG. 3 is a block diagram of another embodiment of a web site using descriptive URLs over the Internet.

FIG. 3 is a block diagram of another embodiment of a web site 300 using descriptive URLs 310 over the Internet. The web site 300 of FIG. 3 is more complex than the web site 204 of FIG. 2 as it includes multiple servers 302 and multiple databases 304*a*, 304*b* all being used to generate web page content 306. For example, multiple servers 302 may access multiple databases 304*a*, 304*b* to generate a plurality of web pages 306 that are part of the web site 300. The servers 302 may access a particular database that includes information about a certain product (price, model, style, etc.). Another database may include advertising information that may appear on a web page (banner ads, coupons, etc.) In addition, another database may include information relating to a certain user (home address, phone number, name, etc.). Further, another database may include billing information (billing address, credit card number, etc.). As a result, a single web page 306 may include content provided by a number of different databases 304*a*, 304*b* and/or a number of different servers 302.

A system 308 for generating descriptive URLs may use the content 306 of web pages and/or meta data from the web site 300 to generate a plurality of descriptive URLs 310 for the web site 300. Thus, as illustrated in FIG. 3, the system 308 for generating descriptive URLs may receive information from many different kinds of systems, databases, servers, etc., in order to generate descriptive URLs 310.

Figure 4:
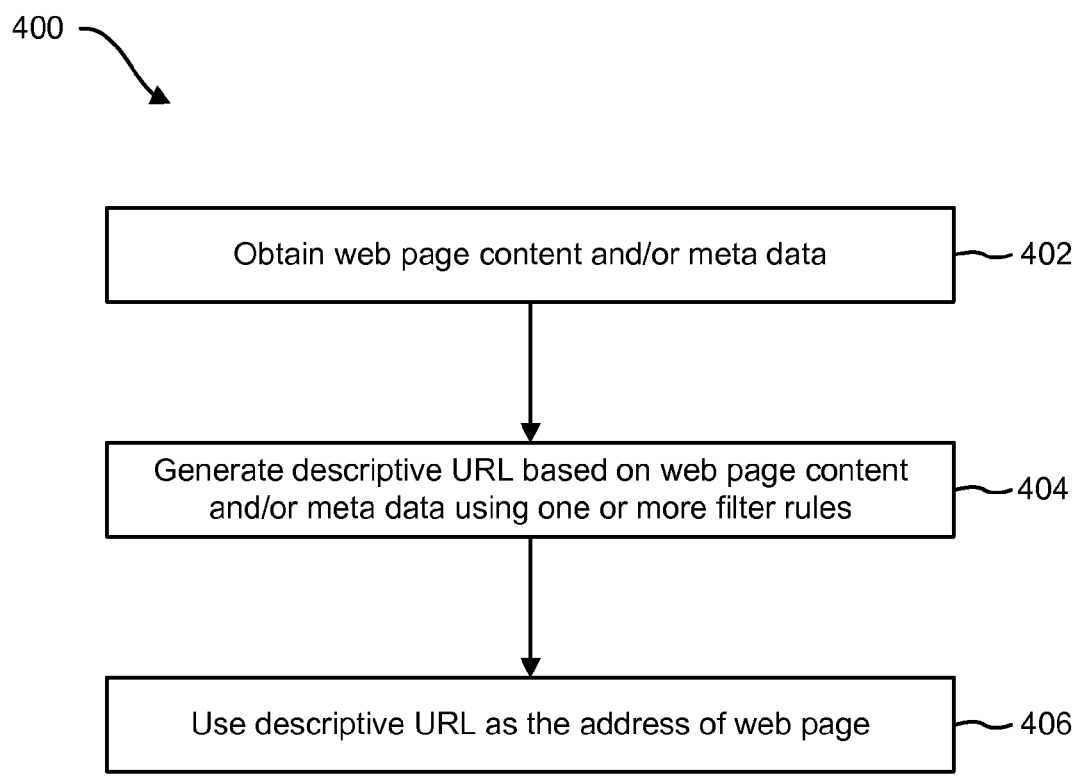
FIG. 4 is a flow diagram illustrating one embodiment of a method for generating descriptive URLs based on web page content.

FIG. 4 is a flow diagram illustrating one embodiment of a method 400 for generating descriptive URLs based on web page content. The method 400 may be implemented by one or more computer systems. For example, the method 400 may be implemented by a single web server, multiple web servers, an online server fleet, etc. In one embodiment, web page content is obtained 402. The web page content may include descriptive words and terms describing a certain product being displayed on the web page. The web page may be a detail page, category page, list page, etc.

A descriptive URL may be generated 404 based on the obtained web page content and/or meta data. In other words, the descriptive URL represents the web page content to a certain extent. In one embodiment, the descriptive URL is generated 404 using filter rules. Filter rules may include certain specifications for the descriptive URL. For example, filter rules may indicate the length of the descriptive URL, the quantity of terms used in the descriptive URL, what terms should be removed from the URL, what terms should be added to the URL, etc. The following figures describe many different filter rules for building the descriptive URL. The generated descriptive URL may be used 406 as the address of the web page or may be used to identify the web page or associated with the web page that includes the web page content from which the descriptive URL was generated.

Figure 5:
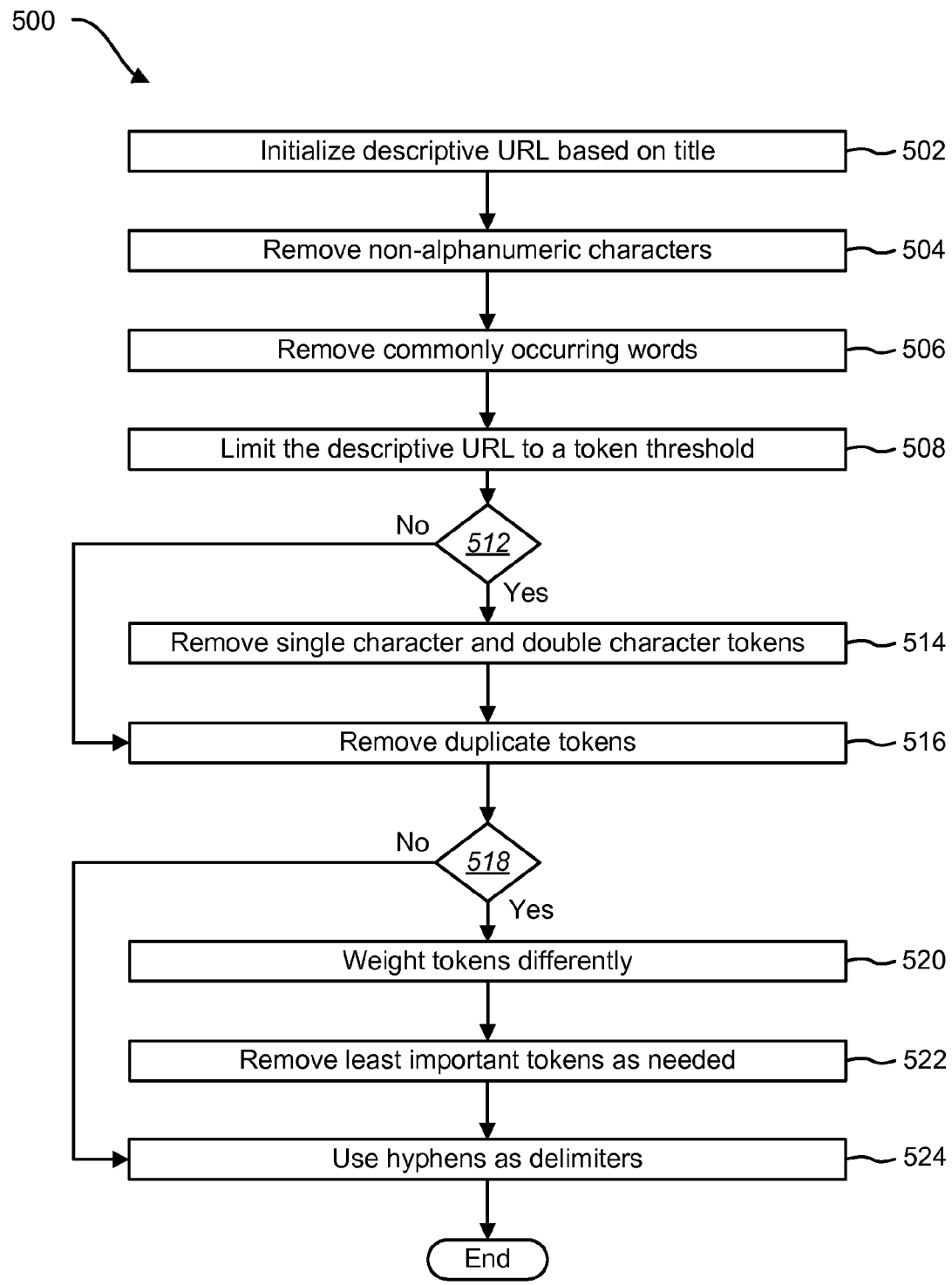
FIG. 5 is a flow diagram illustrating another embodiment of a method for generating descriptive URLs based on web page content.

FIG. 5 is a flow diagram illustrating an embodiment of a method 500 for generating a descriptive URL based on web page content. The descriptive URL may be initialized 502. In one embodiment, the descriptive URL may be initialized 502 based primarily on a title. The title may include the title of a web page, the title of a product being advertised on the web page, etc. Non-alphanumeric characters included in the descriptive URL may be removed 504. In addition, commonly occurring words may also be removed 506 from the descriptive URL. For example, words such as "of", "the", etc. may be removed from the descriptive URL. In one embodiment, removing non-alphanumeric characters and commonly occurring words from the URL may be examples of the filter rules previously mentioned.

In one embodiment, the descriptive URL is limited 508 to a token threshold. The token threshold may refer to the length of the descriptive URL or the number of tokens (i.e., words) used in the descriptive URL, etc. Thus, the token threshold may also be referred to as a word limit threshold for the URL.

A determination 512 is made as to whether the length of the descriptive URL is greater than the token threshold. If it is determined that the length of the URL is greater than the threshold, single character and two character tokens may be removed 514. For example, single character tokens such as "A" and "I" and two character tokens such as "my", "oz", "me", etc. may be removed 514 from the descriptive URL. In one embodiment, duplicate tokens may also be removed 516 from the descriptive URL. Removing single character tokens and two character tokens along with duplicate tokens may be examples of the filter rules mentioned above.

A determination 518 is made as to whether the length of the descriptive URL is still greater than the token threshold. If so, the tokens included in the descriptive URL may be weighted 520 differently. For example, tokens which more accurately describe the web page content may be given a greater weight than other tokens included in the URL. In one embodiment, tokens are weighted 520 according to their length. In another embodiment, a token may receive a higher weight if it appears in both the title and other data relating to the product (brand, model, etc.) Further, a token may receive a higher weight if it occurs before a ':' or a '-' in the title of a product. After the tokens are weighted 520 differently, the least important tokens (the tokens with the smaller weights) are removed 522 until the number of tokens in the descriptive URL is equal to or less than the token threshold.

Hyphens may be used 524 as delimiters to string together tokens in the descriptive URL. For example, hyphens may be used as delimiters to string together the tokens "harry-potter-deathly-hallows".

Figure 6:
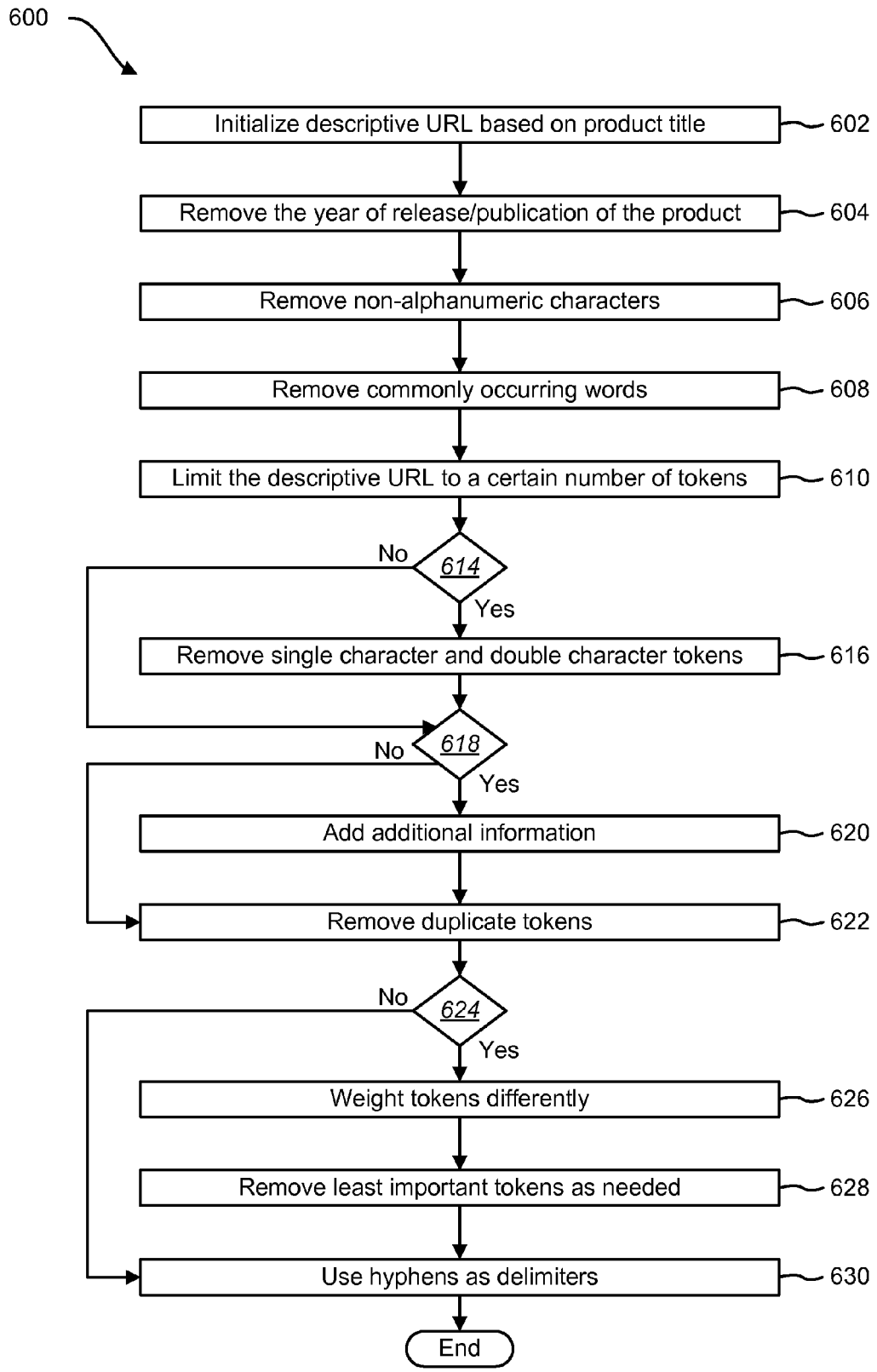
FIG. 6 is a flow diagram illustrating a further embodiment of a method for generating descriptive URLs based on web page content.

FIG. 6 is a flow diagram illustrating another embodiment of a method 600 for generating a descriptive URL based on web page content. In one embodiment, the method 600 may generate the descriptive URL from a product detail web page. The product detail web page may include details regarding a certain product. For example, the details may include an author/artist name, brand name, model number, etc. The descriptive URL generated from a product detail web page may increase the density of relevant keywords from the web page in the URL. In one embodiment, a descriptive URL is initialized 602 to a string based primarily on a title of a product included in the web page content. The title of the product usually includes relevant keywords and is unique and usually short in length.

The descriptive URL may be initialized 602 from certain keywords included in the title of the product or from an identifier assigned to the product displayed on the web page. The identifier may be assigned by an online merchant, the manufacturer of the product, etc. In one embodiment, the title of the product is used to initialize the URL because the title of the product may not change during the lifetime of the assigned identifier.

Certain information regarding the product may be removed 604 from the URL. For example, the year of release or publication of the product may be removed 604 from the URL. The characters that have the form [XXXX] or (XXXX) may be located and removed 604 from the URL. An example of a descriptive URL before and after the removal 604 of the year of publication is as follows. Assume that a descriptive URL is currently set to "Boy-Friend-1971-Susan-Claire". After the removal 604 of the year of publication, the URL will be "Boy-Friend-Susan-Claire".

Non-alphanumeric characters may be removed 606 from the descriptive URL. These characters may include the following: ?, :, !, ^, &, *, ,, :, [, ], (, ), {, }, |, \, ', ", <, >, =. These non-alphanumeric characters may be removed 606 because it is not common for a user to enter these characters as part of a search query.

In one embodiment, commonly occurring words, such as "of", "the", etc., are removed 608 from the URL. The descriptive URL may be limited 610 to a token threshold. In one embodiment, the descriptive URL is limited 610 to five tokens, six tokens or seven tokens (5-7 tokens). One reason to limit the URL to a token threshold is that URLs that include more than 5-7 tokens may appear to be spam. Longer URLs may also increase the time it takes to load a web page (poor website performance) resulting in a less than optimal customer experience.

A determination 614 is made as to whether the length of the URL is greater than the token threshold. If so, single character and two-character tokens may be removed 616 from the URL. If the length of the URL is less than or equal to the token threshold, then the method proceeds to the next determination 618.

A determination 618 is also made as to whether the title of the product is less than a certain number of tokens. If so, certain information may be added 620 to the descriptive URL. In one embodiment, the author/artist name, brand name, model number, or the like, if available, may be added 620 to the URL if the title of the product is less than five tokens. For example, a product may include the following information: Identifier: 0140295569, Locale: de, Title: High Fidelity, Author: Hornby, Nick. The initial descriptive URL may include two tokens, namely "High-Fidelity." Since the initial URL includes less than five tokens, the author's name may be appended 620 to the URL resulting in the descriptive URL of "High-Fidelity-Hornby-Nick."

Duplicate tokens may be removed 622 from the URL. For example, duplicate tokens that appear between the author/artist name, brand name, etc. and the title of the product may be removed 622 from the URL. Additionally, other duplicate tokens may be removed 622 without regard to the position of the duplicate token. For example, if a descriptive URL was currently set to "High-Fidelity-Hornby-Hornby-Nick", after this step the descriptive URL would be set to "High-Fidelity-Hornby-Nick". One reason that duplicate tokens may be removed is because duplicate tokens, to some search engines, may appear to be spam or may be more likely to be classified as spam. Duplicate tokens also prevent other relevant tokens from being added to the URL by taking up the token quota.

A determination 624 is made as to whether the length of the descriptive URL is still greater than a certain threshold. If so, the tokens in the URL may be weighted 626 differently. For example, if the length of the URL was still greater than five tokens (where five tokens was the token threshold), the tokens may be weighted 626 differently. The tokens may be weighted using different techniques. For example, in one embodiment, if the descriptive URL still includes more than five tokens, the longest five tokens in the URL description may be retrieved and weighted based on their order of appearance in the title of the product. For example, in a product having the title: Seagate Portable External Hard Drive—Hard Drive—60 GB—external—2.5" —Hi-Speed USB—5400 rpm—buffer: 2 MB. The tokens in a corresponding descriptive URL with the highest weights, according to this embodiment for weighting, may be "Seagate—Portable—External—external—buffer."

Another way to weight the tokens in order of importance is to sort them in decreasing order by length. Additionally, if a token is part of the brand or model and is already present in the title of the product, then the length of the token may be weighted by a factor of 5 (to ensure that it definitely appears in the final descriptive URL). If a token is present in a "keeplist", then the token may be weighted by a factor of 3 (this token is kept in the final descriptive URL if possible, but it is weighted lower than the brand and model tokens that are specific to the identifier). A keeplist is a list of product category-specific keywords (such as "jeans", "shoes", "men's", etc. for an apparel category) that are to be kept in (not deleted from) the descriptive URL of a product belonging to that product category.

After the tokens are weighted 626 differently, the least important tokens (the tokens with the smaller weights) are removed 628 until the token length of the descriptive URL is equal to or less than the token threshold.

After the least important tokens are removed 628, hyphens may be used 630 as delimiters to connect the tokens of the URL. Also, as shown in FIG. 6, hyphens may be used 630 as delimiters to connect the tokens of the URL after a determination 624 as to whether the length of the descriptive URL is still greater than a certain threshold.

Figure 7:
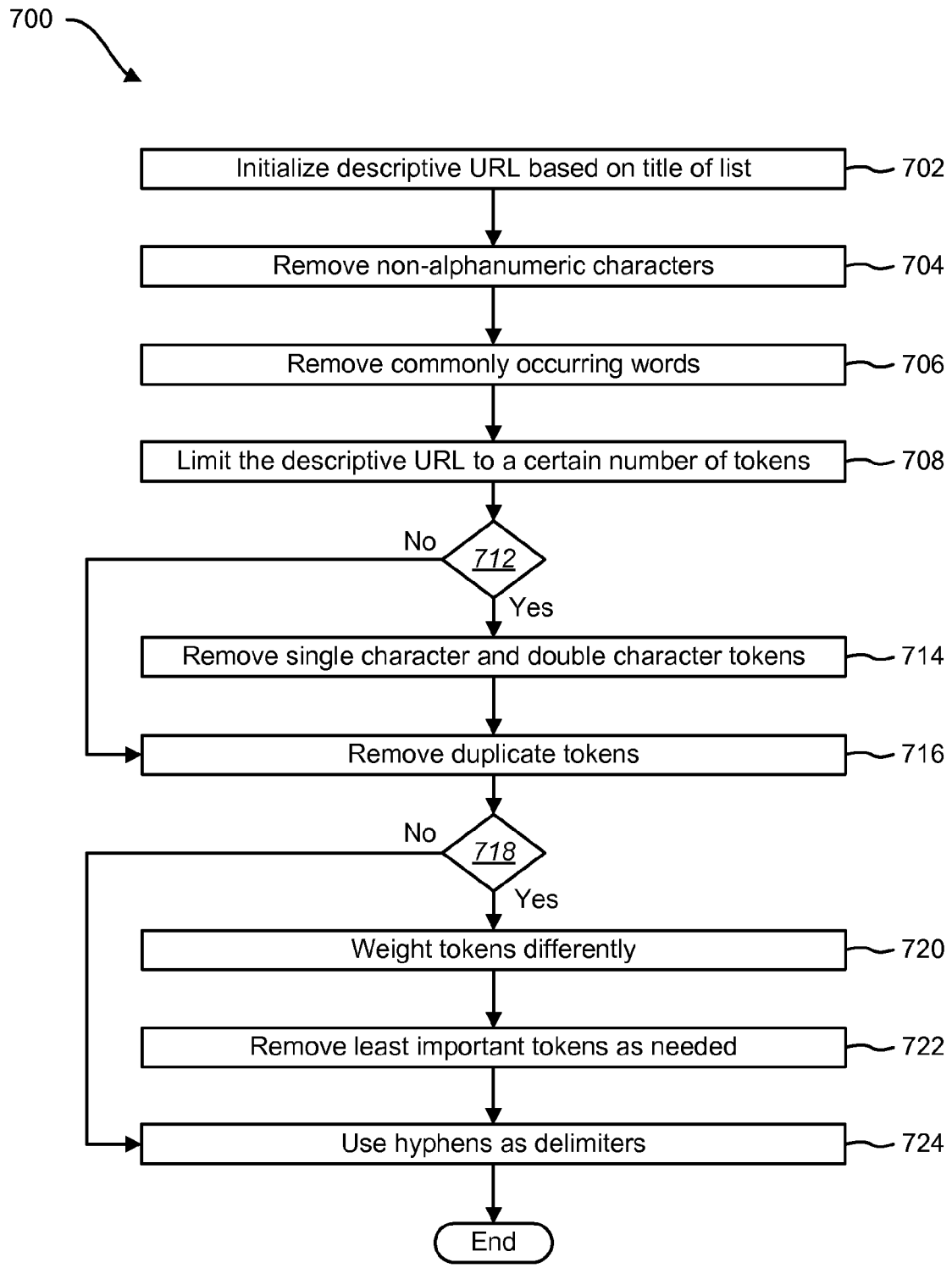
FIG. 7 is a flow diagram illustrating another embodiment of a method for generating descriptive URLs from web page content.

FIG. 7 is a flow diagram illustrating another embodiment of a method 700 for generating a descriptive URL from web page content. The embodiment of FIG. 7 may be used with a list page. A list page may include a list of items (products, services, places, people, etc.) that a user or web site wants to combine into a list. The list page may include a list of a general or specific nature.

The descriptive URL is initialized 702 based on the title of the list included in the list page. Non-alphanumeric characters may be removed 704 from the initialized descriptive URL. In addition, commonly occurring words, such as "of", "the", etc. may also be removed 706 from the descriptive URL. The URL may also be limited 708 to a certain number of tokens, which may be referred to as a token threshold. For example, the descriptive URL may be limited 708 to 5-7 tokens.

A determination 712 is made as to whether the token or word length of the descriptive URL is greater than the token threshold. If so, single character and two-character tokens may be removed 714. Further, duplicate tokens may also be removed 716.

A determination 718 is made as to whether the length of the URL is still greater than the threshold. If so, the remaining tokens in the URL may be weighted 720 differently in order to remove the less important tokens from the URL. In one embodiment, if the URL still has more than 5 tokens, the weight for each token may be the length of the token. Another aspect of weighting may be that if the token is part of a title but it is only part of an optional or secondary part of the title, its weight may be multiplied by a scaling down factor (e.g., 0.25) in order to reduce the weight of that token. Once the tokens have been weighted, then the top five tokens by weight may be taken in the order of their appearance in the title and placed at the beginning of the descriptive URL.

After the tokens are weighted 720 differently, the least important tokens (the tokens with the smaller weights) are removed 722 until the token length of the descriptive URL is equal to or less than the token threshold.

After the least important tokens are removed 722, hyphens may be used 724 as delimiters to connect the tokens of the URL. Also, as shown in FIG. 7, hyphens may be used 724 as delimiters to connect the tokens of the URL after a determination 718 as to whether the length of the descriptive URL is still greater than a certain threshold.

While processing the descriptive URL, it should be noted that leading and trailing spaces may be eliminated. Further, spaces between tokens may be normalized. In other words, multiple spaces between tokens may be replaced by a single space.

Figure 8:
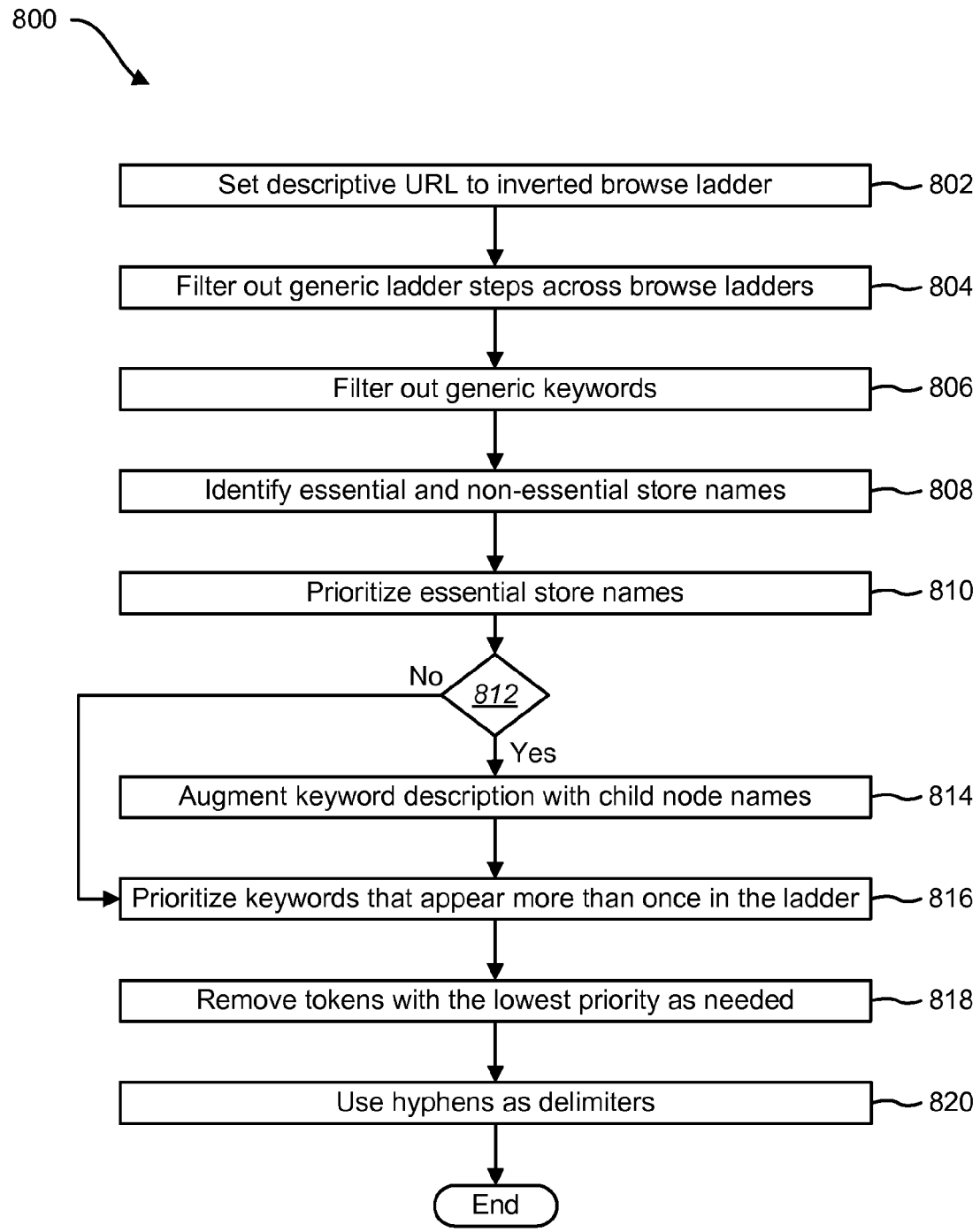
FIG. 8 is a flow diagram illustrating an additional embodiment of a method for generating descriptive URLs from web page content.

FIG. 8 is a flow diagram illustrating another embodiment of a method 800 for generating descriptive URLs from web page content. The embodiment of FIG. 8 may be used with a browse page that includes a browse ladder as well as a browse node name. With this embodiment, an entire browse ladder may be considered in the generation of the descriptive URL instead of just the browse node name. A browse node is merely a web page for a (sub)category and the browse node name is the name of that (sub)category. Examples of browse node names may include, but are not limited to, "Books", "Science Fiction Books", "Cameras", "Digital Cameras", "Sony Digital Cameras", etc. If the product categorization is considered as being a hierarchy or a tree going from the broader category (e.g. "Books") to progressively narrower categories (e.g. "Science Fiction Books"), then the path traced from the root of that hierarchy to any single "node" is called the browse ladder. For example "Books>Science Fiction & Fantasy>Science Fiction>High Tech". A browse node name (e.g. "Jeans") is often too short and ambiguous. The browse ladder is a logical and descriptive categorization. In one embodiment, a descriptive URL is set 802 to the inverted browse ladder. The ladder may be inverted so that the more relevant keywords appear earlier in the descriptive URL. Search engines may value keywords in the order of their appearance in the URL.

Generic ladder steps across browse ladders may be filtered out 804 of the URL. For example, generic ladder steps may include "Subjects", "Genre", etc. In addition, generic keywords may also be filtered out 806 of the descriptive URL. Examples of generic keywords may include "&", "by", "of", "on", "the", "and", "at", "in", "your", "about", etc.

In one embodiment, essential and non-essential store names may be identified 808. Store names are category names. In certain embodiments, store names may be higher level category names. For example, "books" may be a store name. The store name "books" is often part of search queries, and it may be essential that "books" is part of the keyword description for certain descriptive URLs. The essential store names may be prioritized 810 such that one or more of them may be in the final five tokens in the descriptive URL. In one configuration, one or more essential store names may be identified and added to the descriptive URL. In another configuration, one or more non-essential store names may be identified and removed from the descriptive URL.

A determination 812 is made as to whether there are less than a certain number of tokens, the token threshold. If so, keyword descriptions may be augmented 814 with child node names. A child node is a node lower than a given node in the browse ladder/hierarchy. For example, "Digital Cameras" and "Film Cameras" are child nodes of the "Cameras" node. Child nodes may be thought of as sub-categories of the parent category. In one embodiment, the keyword descriptions are augmented 814 if there are less than five tokens in the descriptive URL. Keywords that appear more than once in the browse ladder are prioritized 816 such that they are one of the final five tokens in the descriptive URL. After the tokens are prioritized 816, the tokens with the lowest priority are removed 818 as needed (i.e., until the length of the descriptive URL is equal to or less than the token threshold). Hyphens may be used 820 as delimiters to connect the tokens of the URL.

Figure 9:
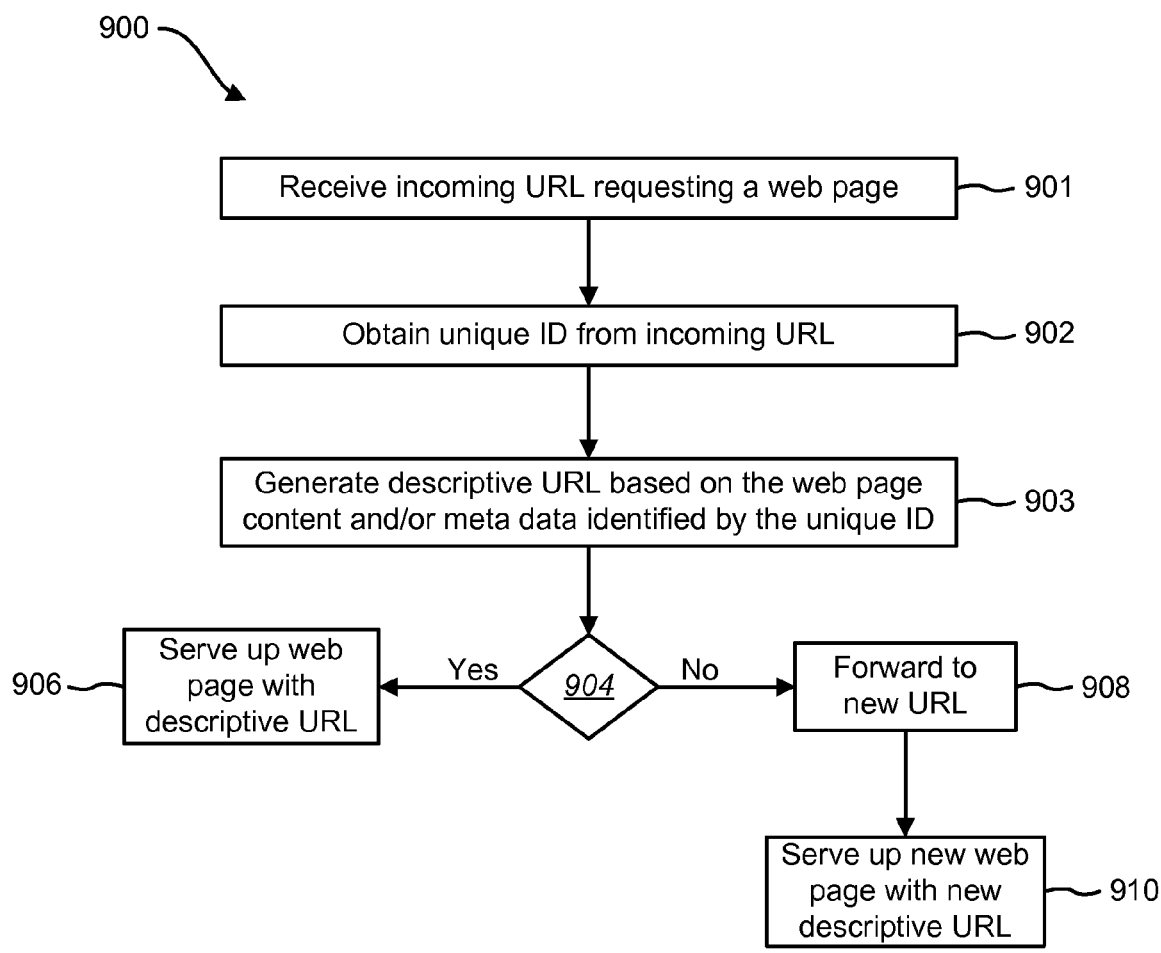
FIG. 9 is a flow diagram illustrating one embodiment of a method for determining if a descriptive URL is active.

FIG. 9 is a flow diagram illustrating one embodiment of a method 900 for determining if a descriptive URL is active (if it is still being used as the URL for the web page content being requested) and for redirecting old/inactive URLs to the new/current URL for that web page.

The method 900 may detect if a descriptive URL has changed and, if the URL has changed, perform a redirect from the old descriptive URL to a new descriptive URL. There are a number of reasons why the method of FIG. 9 may be useful. For example, allowing search engines to index the same page under multiple URLs may cause URL fragmentation. Search engines may then assume that each different URL belongs to a different web page, which causes the web page to not rank highly on search results. Additionally, and by way of further example, a change in the URLs may be detrimental for the rankings of those pages in search results on search engines like Google, Yahoo, etc. since it takes them some time (a few weeks) to recrawl and reindex the pages under their new URLs. This may result in a loss of free search traffic (and hence revenue).

In one embodiment, an incoming URL is received 901 requesting a web page. In certain embodiments, the descriptive URLs may include a unique identification (ID) that identifies the web page that it is associated with. With the unique ID in the descriptive URL, a server that receives and processes the incoming URL request may use the unique ID to determine the web page that was requested. In one embodiment, patterns are used for the descriptive URLs so that systems may identify the portion of the URL that is the unique ID.

Some examples of possible descriptive URLs will be set forth. These examples do not include the domain portion of the URL. For the full descriptive URL of each of these examples, the string "HTTP://www.WebSiteXYZ.com/" may be added to the beginning of each of the following examples. Some examples of possible descriptive URLs for product detail web pages include, but are not limited to, the following:

Harry-Potter-Deathly-Hallows-Book/dp/0545010225
Flip-Video-Camcorder-60-Minutes-White/dp/B000ONFQ2K
Kaiser-9-Inch-Springform-Red/dp/B000MM88MS Some examples of possible descriptive URLs for list pages include, but are not limited to, the following:

Tiny-digital-cameras-packed-features/lm/R270U8
VLMOXCOB books-that-coming-2007-asome/lm/R1EC78D1
A0LGDS ten-best-movies-that-arent/lm/1U06C911GFMBX Some examples of possible descriptive URLs for browse pages include, but are not limited to, the following:

music-rock-classical-pop-jazz/b?ie=UTF8&node=5174
New-Used-Textbooks-Books/b?ie=UTF8&node=465600
pet-supplies-birds-cats-dogs/b?ie=UTF8&node=12923371

The above examples illustrate possible descriptive URLs according to some embodiments and are not meant to limit the inventive subject matter herein. Other types of descriptive URLs may be generated depending on the specific implementation of the systems and methods herein.

After the incoming URL is received 901, the server(s) obtains 902 the unique ID from the incoming URL. Using the unique ID, the server(s) identifies the web page content and/or meta data and a descriptive URL is generated 903 using the web page content. The systems and methods disclosed herein may be used to generate 903 the descriptive URL.

A determination 904 is made as to whether the incoming URL is equal to the generated 903 URL. If the incoming URL is equal to the generated 903 URL, then the incoming URL is still active. In one embodiment, the URLs may be compared by a character-by-character comparison of the entire string for each URL.

If it is determined 904 that the requested URL is still active, a web page associated with the incoming URL is served up 906 to the client in order to be displayed to a user. However, if it is determined 904 that the incoming URL is not active (the incoming URL is not the same as the newly generated 903 URL), the request is forwarded 908 or redirected 908 to the correct web page content (which now has a new descriptive URL). The correct web page (i.e., the web page that used to be identified by the incoming URL but that is now being identified by a new URL) is served up 910 for display to the user.

Figure 10:
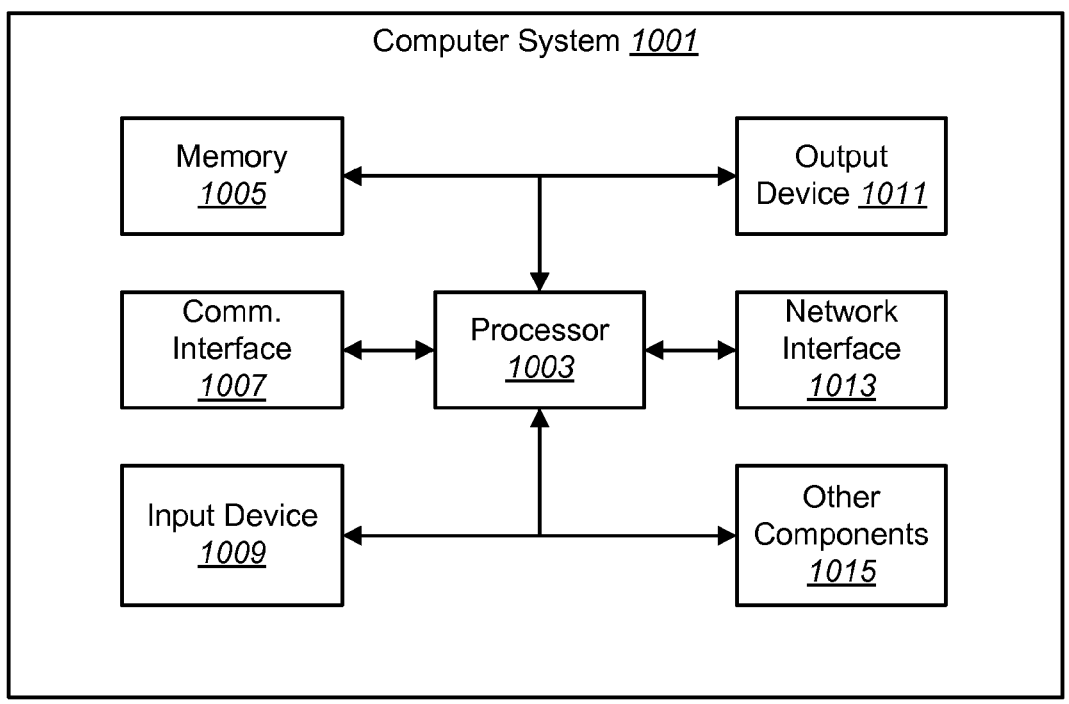
FIG. 10 illustrates various components that may be utilized in a computer system.

FIG. 10 illustrates various components that may be utilized in a computer system 1001. The various servers and clients referred to herein may include some or all of the components shown in FIG. 10. One or more computer systems may be used to implement the various systems and methods disclosed herein. The illustrated components may be located within the same physical structure or in separate housings or structures. Thus, the term computer or computer system is used to mean one or more broadly defined computing devices unless it is expressly stated otherwise. Computing devices include the broad range of digital computers including microcontrollers, hand-held computers, personal computers, servers, mainframes, supercomputers, minicomputers, workstations, and any variation or related device thereof.

The computer system 1001 is shown with a processor 1003 and memory 1005. The processor 1003 may control the operation of the computer system 1001 and may be embodied as a microprocessor, a microcontroller, a digital signal processor (DSP) or other device known in the art. The processor 1003 generally performs logical and arithmetic operations based on program instructions stored within the memory 1005. The instructions in the memory 1005 may be executable to implement the methods described herein.

The computer system 1001 may also include one or more communication interfaces 1007 and/or network interfaces 1013 for communicating with other electronic devices. The communication interface(s) 1007 and the network interface(s) 1013 may be based on wired communication technology, wireless communication technology, or both.

The computer system 1001 may also include one or more input devices 1009 and one or more output devices 1011. The input devices 1009 and output devices 1011 may facilitate user input. Other components 1015 may also be provided as part of the computer system 1001.

FIG. 10 illustrates only one possible configuration of a computer system 1001. Various other architectures and components may be utilized.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

Functions such as executing, processing, performing, running, determining, notifying, sending, receiving, storing, requesting, and/or other functions may include performing the function using a web service. Web services may include software systems designed to support interoperable machine-to-machine interaction over a computer network, such as the Internet. Web services may include various protocols and standards that may be used to exchange data between applications or systems. For example, the web services may include messaging specifications, security specifications, reliable messaging specifications, transaction specifications, metadata specifications, XML specifications, management specifications, and/or business process specifications. Commonly used specifications like SOAP, WSDL, XML, and/or other specifications may be used.

The steps of a method or algorithm described in connection with the embodiments disclosed herein may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. An exemplary storage medium may be coupled to a processor such that the processor may read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the embodiment that is being described, the order and/or use of specific steps and/or actions may be modified without departing from the scope of the claims.

While specific embodiments have been illustrated and described, it is to be understood that the claims are not limited to the precise configuration and components illustrated above. Various modifications, changes and variations may be made in the arrangement, operation and details of the embodiments described above without departing from the scope of the claims.

What is claimed is:

1. A method for generating a Uniform Resource Locator (URL), comprising:
   obtaining content associated with a web page;
   generating a URL based on the content of the web page, wherein the URL comprises one or more tokens;
   limiting the URL to a token threshold, wherein the token threshold defines a maximum number of words in the URL;
   removing one or more tokens from the URL; and
   associating the URL with the web page.

2. The method of claim 1, wherein removing one or more tokens from the URL comprises removing single-character and two-character tokens from the URL if the length of the URL exceeds the token threshold.

3. The method of claim 1, wherein removing one or more tokens from the URL comprises removing duplicate tokens from the URL.

4. The method of claim 1, further comprising weighting the tokens of the URL if the length of the URL exceeds the token threshold.

5. The method of claim 4, further comprising removing tokens with smallest weights until the length of the URL does not exceed the token threshold.

6. The method of claim 1, wherein the web page comprises a detail web page having details regarding a product.

7. The method of claim 6, wherein removing one or more tokens from the URL comprises removing a year of release or publication for the product from the URL.

8. The method of claim 6, further comprising adding additional tokens to the URL if the length of the URL is less than the token threshold.

9. The method of claim 8, wherein the additional tokens include a brand name, an author's name, an artist's name or a model number.

10. The method of claim 1, wherein the web page comprises a list web page having one or more lists.

11. The method of claim 1, wherein the web page includes a browse ladder.

12. The method of claim 11, wherein generating a URL comprises setting the URL to an inverted browse ladder.

13. The method of claim 12, wherein removing one or more tokens from the URL comprises removing generic ladder steps from the URL.

14. The method of claim 12, further comprising prioritizing the tokens of the URL if the length of the URL exceeds the token threshold.

15. The method of claim 12, further comprising adding child node names to the URL if the length of the URL is less than the token threshold.

16. The method of claim 1, further comprising identifying one or more essential store names and adding at least one essential store name token to the URL.

17. The method of claim 1, wherein the URL is generated on the fly.

18. The method of claim 1, wherein the URL is generated before it is needed and stored for future use.

19. The method of claim 1, further comprising:
   receiving a request from a client, wherein the request includes an incoming URL;
   determining that the incoming URL is associated with the web page;
   determining that the incoming URL is different than the URL; and
   forwarding the request to the URL.

20. The method of claim 1, wherein the URL is generated based on the content of the web page and meta data associated with the web page.

21. A non-transitory computer-readable storage medium comprising executable instructions for performing the method of claim 1.

22. A computer system configured to generate a Uniform Resource Locator (URL), the computer system comprising:
   a processor;
   memory in electronic communication with the processor;
   instructions stored in the memory, the instructions being executable to:
      obtain content associated with a web page;
      generate a URL based on the content of the web page, wherein the URL comprises one or more tokens;
      limit the URL to a token threshold, wherein the token threshold defines a maximum number of words in the URL;
      remove one or more tokens from the URL; and
      associate the URL with the web page.

23. The computer system of claim 22, wherein the instructions to remove one or more tokens from the URL are executable to remove single-character and two-character tokens from the URL if the length of the URL exceeds the token threshold.

24. The computer system of claim 22, wherein the instructions to remove one or more tokens from the URL are executable to remove duplicate tokens from the URL.

25. The computer system of claim 22, wherein the instructions are further executable to weight the tokens of the URL if the length of the URL exceeds the token threshold.

26. The computer system of claim 25, wherein the instructions are further executable to remove tokens with smallest weights until the length of the URL does not exceed the token threshold.

27. The computer system of claim 22, wherein the web page comprises a detail web page having details regarding a product.

28. The computer system of claim 27, wherein the instructions to remove one or more tokens from the URL are executable to remove a year of release or publication for the product from the URL.

29. The computer system of claim 27, wherein the instructions are further executable to add additional tokens to the URL if the length of the URL is less than the token threshold.

30. The computer system of claim 29, wherein the additional tokens include a brand name, an author's name, an artist's name or a model number.

31. The computer system of claim 22, wherein the web page comprises a list web page having one or more lists.

32. The computer system of claim 22, wherein the web page includes a browse ladder.

33. The computer system of claim 32, wherein the instructions to generate a URL are executable to set the URL to an inverted browse ladder.

34. The computer system of claim 33, wherein the instructions to remove one or more tokens from the URL are executable to remove generic ladder steps from the URL.

35. The computer system of claim 33, wherein the instructions are further executable to prioritize the tokens of the URL if the length of the URL exceeds the token threshold.

36. The computer system of claim 33, wherein the instructions are further executable to add child node names to the URL if the length of the URL is less than the token threshold.

37. The computer system of claim 22, wherein the instructions are further executable to identify one or more essential store names and add at least one essential store name token to the URL.

38. The computer system of claim 22, wherein the URL is generated on the fly.

39. The computer system of claim 22, wherein the URL is generated before it is needed and stored for future use.

40. The computer system of claim 22, wherein the instructions are further executable to:
receive a request from a client, wherein the request includes an incoming URL;
determine that the incoming URL is associated with the web page;
determine that the incoming URL is different than the URL; and
forward the request to the URL.

41. The computer system of claim 22, wherein the URL is generated based on the content of the web page and meta data associated with the web page.

42. A non-transitory computer-readable storage medium comprising executable instructions for:
obtaining content associated with a web page;
generating a URL based on the content of the web page, wherein the URL comprises one or more tokens;
limiting the URL to a token threshold, wherein the token threshold defines a maximum number of words in the URL;
removing one or more tokens from the URL; and
associating the URL with the web page.

43. A computer system configured to generate a Uniform Resource Locator (URL), the computer system comprising:
means for obtaining content associated with a web page;
means for generating a URL based on the content of the web page, wherein the URL comprises one or more tokens;
means for limiting the URL to a token threshold, wherein the token threshold defines a maximum number of words in the URL;
means for removing one or more tokens from the URL; and
means for associating the URL with the web page.

* * * * *